(12) United States Patent
Nakano et al.

(10) Patent No.: US 7,674,022 B2
(45) Date of Patent: Mar. 9, 2010

(54) MOTORCYCLE HEADLIGHT DEVICE

(75) Inventors: Shinichi Nakano, Suita (JP); Yoshinobu Yamamoto, Kakogawa (JP); Mikio Domoto, Kakogawa (JP); Makoto Baino, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 288 days.

(21) Appl. No.: 11/595,590

(22) Filed: Nov. 9, 2006

(65) Prior Publication Data

US 2008/0112174 A1 May 15, 2008

(51) Int. Cl.
*B62J 6/00* (2006.01)

(52) U.S. Cl. ........................ 362/473; 362/475; 362/466; 362/514; 362/286; 362/285; 362/287; 362/284

(58) Field of Classification Search .................. 362/466, 362/475, 473, 514, 286, 285, 284, 287; 315/82, 315/79
See application file for complete search history.

(56) References Cited

U.S. PATENT DOCUMENTS

| | | | | |
|---|---|---|---|---|
| 5,217,087 A | * | 6/1993 | Ikegami et al. | 180/219 |
| 5,426,571 A | * | 6/1995 | Jones | 362/466 |
| 2005/0099818 A1 | | 5/2005 | Gropp et al. | |
| 2007/0086203 A1 | * | 4/2007 | Nakano et al. | 362/514 |

FOREIGN PATENT DOCUMENTS

| | | |
|---|---|---|
| JP | 63-46981 | 2/1988 |
| JP | 63-053137 | 3/1988 |
| JP | 63-107290 | 7/1988 |
| JP | 64-041484 | 2/1989 |
| JP | 06-115397 | 4/1994 |
| JP | 10-324191 | 12/1998 |
| JP | 2001-219881 | 8/2001 |
| JP | 2001-347977 | 12/2001 |
| JP | 2004-155404 | 6/2004 |
| JP | 2004-534683 | 11/2004 |

\* cited by examiner

*Primary Examiner*—Sandra L O'Shea
*Assistant Examiner*—Jessica L McMillan

(57) ABSTRACT

To provide a headlight device, in which a change of the region of illumination afforded by the headlamp can be initiated substantially punctual to the start of cornering of the motorcycle, the headlight device includes a headlamp for illuminating forwardly of the motorcycle, a light-distribution adjusting mechanism for changing a region of illumination, a bank angle detecting unit for detecting a bank angle $\delta$ of the motorcycle in reference to an angular velocity $\omega y$ about a vertical axis of the motorcycle, an angular velocity $\omega r$ about a longitudinal axis of the motorcycle and a motorcycle velocity v, and a light-distribution controller for controlling the light-distribution adjusting mechanism based on the detected bank angle $\delta$ to change the region of illumination into an area further away from and at least inwardly of a direction of turn of the motorcycle during a cornering.

20 Claims, 11 Drawing Sheets

MOTORCYCLE HEADLIGHT DEVICE

BACKGROUND OF THE INVENTION

1. Field of the Invention

The present invention relates to a headlight device for a motorcycle, which is designed to permit a motorcycle rider to gain a relatively large illuminated field of view forwardly of the motorcycle while the latter makes the curve during a night drive.

2. Description of the Prior Art

As is well known to those skilled in the art, the motorcycle, when ready to change the direction of travel either leftward or rightward with respect to the direction of straightforward run thereof while traveling at a certain speed, is tilted or banked either leftward or rightward at a bank angle. However, considering that the headlight used in most motorcycles now in use is fixed in position to the motorcycle frame structure and, therefore, the region of illumination cast by the motorcycle headlight is correspondingly tilted as the motorcycle is banked, the amount of light distributed by the motorcycle headlight in an area inwardly of the direction of movement of the motorcycle, in which the motorcycle rider's eyes are focused, particularly during the cornering at night decreases, with the rider's field of view forwardly of the direction of travel narrowed consequently.

More specifically, referring to FIG. 18 showing the forward field of view available to the motorcycle rider during the straight forward drive at night, the region of illumination A cast by the motorcycle headlight upon an area of the road surface forwardly of the motorcycle spreads in leftward and rightward directions of the motorcycle, which are parallel to the horizontal datum line HL. However, as best shown in FIG. 19, when the motorcycle makes the curve in a leftward direction along a curved lane 50 as shown by the arrow-headed line P therein, as the frame structure is tilted in the corner, the illumination region A cast similarly by the motorcycle headlight on an area of the road surface tilts downwardly leftward as compared with the illumination region A exhibited during the straight forward run of the motorcycle. Therefore, a forward portion of the road surface inwardly of the turning direction of the motorcycle as indicated by the dotted circle B in FIG. 19, where the motorcycle rider's eyes are generally focused during the cornering encompasses less portion of the illumination region A than that during the straight forward run, with the consequence that the rider's field of view forwardly of the direction of cornering is virtually narrowed.

In view of the foregoing, the assignee of the present invention has suggested in, for example, the Japanese Laid-open Patent Publication No. 2001-347977, published Dec. 18, 2001 by the same assignee, the headlight device for a motorcycle, which is effective to expand the rider's field of view during the cornering at night. According to this published patent document, the motorcycle headlight device is so designed and so configured that based on the bank angle of the motorcycle detected by a bank angle detecting unit, a rotation control unit may control a drive unit to cause the latter to pivot a combination of a lens and a light emitting element, forming respective parts of a headlamp module, about the optical axis of the headlamp module in a direction counter to the direction of tilting of the motorcycle over an angle corresponding to the detected bank angle of the motorcycle. With this known headlight device, a forward portion of the road surface inwardly of the turning direction of the motorcycle, where the motorcycle rider's eyes are generally focused during the cornering, can encompass more light distribution illuminated by the headlamp module, with the rider's field of view forwardly of the direction of cornering increased consequently.

However, the motorcycle headlight device such as discussed above has been found having a problem. Specifically, the bank angle detecting unit calculates the bank angle of the motorcycle on the basis of the traveling velocity and the angular velocity of turn of the motorcycle about a vertical axis of the motorcycle. The angular velocity of turn of the motorcycle about the vertical axis corresponds to an angular velocity of turning in a horizontal plane, defined by the angle of steering of the motorcycle handlebar. Accordingly, the bank angle detected, i.e., calculated by the bank angle detecting unit corresponds to the bank angle exhibited during the steady turning at a predetermined bank angle.

However, considering that during the cornering it is usual for the motorcycle rider to tilt the motorcycle, followed by turning of the motorcycle handlebar in a direction in which he or she desire to drive, the bank angle of the motorcycle based on the angular velocity about the vertical axis of the motorcycle and the traveling velocity tends to be calculated with a certain length of time delayed from the moment, at which the actual banking of the motorcycle starts. For this reason, the headlamp module is rotated or pivoted with a certain length of time delayed relative to the banking of the motorcycle and, therefore, at an initial stage, in which the motorcycle starts banking, distribution of light cast by the headlamp module would not result in a proper illumination sufficient to allow the motorcycle drive to enjoy a relatively large field of view forwardly of the motorcycle. This delay in operation of the headlamp module is indeed prominent particularly where the motorcycle is maneuvered with legerity such as occurring during traveling in, for example, a zigzag course.

It is also well known that when the motorcycle is banked during the cornering, the height of the headlamp module above the road surface lowers as compared with that during the straight forward run with the motorcycle held in an erected position. Once the height of the headlamp module is so lowered, the distance of reach of the light cast by the headlamp module in a direction forwardly of the motorcycle is reduced a quantity corresponding to the height so lowered and, accordingly, during the cornering at night, the headlamp module is unable to illuminate the road surface a distance further away from the motorcycle as is the case with the straight forward travel.

SUMMARY OF THE INVENTION

In view of the foregoing, the present invention has been devised to substantially eliminate the problems and inconveniences inherent in the prior art headlight devices and is intended to provide a headlight device, in which a change of the region of illumination afforded by the headlamp module can be initiated substantially punctual to the start of cornering of the motorcycle. Another important object of the present invention is to provide a headlight device of the type referred to above, in which the region of illumination afforded by the headlamp module can be changed to secure a required reach of the illumination at all times regardless of the tilt of the motorcycle.

In order to accomplish these objects of the present invention, the headlight device of the present invention in accordance with one aspect thereof includes a headlamp module for illuminating an area of a road surface forwardly of the motorcycle, a light-distribution adjusting mechanism for changing a region of illumination cast by the headlamp module, a bank angle detecting unit for detecting a bank angle of the motorcycle in reference to an angular velocity about a vertical axis of the motorcycle, an angular velocity about a longitudinal axis of the motorcycle and a motorcycle traveling velocity, and a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further-away from and at least inwardly of a direction of turn of the motorcycle to be illuminated.

It is to be noted that the terms "vertical axis" and "longitudinal axis" of the motorcycle referred to hereinabove and hereinafter are to be understood as respective axes passing through the center of gravity of the motorcycle in vertical and longitudinal directions of the motorcycle, respectively. It is also to be noted that the angular velocity about the vertical axis of the motorcycle and that about the longitudinal axis of the motorcycle may be represented by the angular velocity measured at a location somewhat displaced from the center of gravity of the motorcycle.

According to the present invention, since not only the angular velocity about the vertical axis of the motorcycle, but also the angular velocity about the longitudinal axis of the motorcycle is taken into calculation to determine the bank angle of the motorcycle, it is possible to calculate the motorcycle bank angle at a proper timing substantially synchronized with the start of cornering of the motorcycle. Accordingly, with no substantial delay in start of inclination of the motorcycle during the cornering, the region of illumination of the headlamp module can be changed or expanded in good time to secure a relatively large field of view.

Preferably, the bank angle detecting unit may include a uniaxial angular velocity sensor. This uniaxial angular velocity sensor has a sensor axis positioned on a plane generally intermediate of a width of the motorcycle and inclined relative to the vertical axis of the motorcycle and also to the longitudinal axis of the motorcycle. This is particularly advantageous in that both of the angular velocity about the vertical axis of the motorcycle and the angular velocity about the longitudinal axis thereof can be detected simultaneously by the single uniaxial angular velocity sensor. Therefore, as compared with the case in which two uniaxial angular velocity sensors are employed, the structure can be simplified and the motorcycle bank angle can be calculated in good time synchronized with the start of cornering of the motorcycle.

The sensor axis of the uniaxial angular velocity sensor referred to above is preferably inclined at an angle exceeding 0°, but not greater than 45° relative to the vertical axis of the motorcycle. Specifically, if the angle of inclination of the sensor axis exceeds 0°, the angular velocity about the longitudinal axis of the motorcycle can be detected in addition to the angular velocity about the vertical axis of the motorcycle. On the other hand, if the angle of inclination of the sensor axis is chosen to be of a value not greater than 45°, an angular velocity properly matching with of the angular velocity about the vertical axis of the motorcycle and the angular velocity about the longitudinal axis of the motorcycle can be obtained without permitting a component of the angular velocity about the longitudinal axis of the motorcycle to be too large.

The present invention in accordance with a second aspect thereof provides a headlight device for a motorcycle, which includes a headlamp module for illuminating an area of a road surface forwardly of the motorcycle, a light-distribution adjusting mechanism for changing a region of illumination cast by the headlamp module, a bank angle detecting unit for detecting a bank angle of the motorcycle, and a light-distribution controller for controlling the light-distribution adjusting mechanism based on the motorcycle bank angle, detected by the bank angle detecting unit, to shift or expand the region of illumination further away from the motorcycle in a direction parallel to a mid-center plane of the motorcycle.

It is to be noted that the term "mid-center plane" of the motorcycle used hereinabove and hereinafter is intended to means a plane containing a point intermediate of the width of the motorcycle and deployed in the vertical direction of the motorcycle.

According to the second aspect of the present invention, at a proper timing and without any substantial delay relative to the start of tilt of the motorcycle during the cornering, the area of the road surface can be illuminated by a device for turning the headlamp module in a direction, for example, upwardly, to an extent forwardly further away from the motorcycle comparable with that during the straight forward travel of the motorcycle in an upright position and, therefore, a desired distance of reach of the illumination from the headlight device can be maintained so that a substantially large field of view further away from the motorcycle can be secured with respect to the direction of travel of the motorcycle.

In the headlight device according to the second aspect of the present invention, the light-distribution adjusting mechanism is preferably operable to turn upwards or downwards a headlight casing accommodating therein a light emitting element of the head light module. According to this structural feature, with a simplified mechanism, the region of illumination can be changed to enable the area of the road surface further away from the motorcycle to be illuminated when the motorcycle is banked.

In the headlight device according to any one of the aspects of the present invention, the light-distribution controller preferably perform a control to change the region of illumination, defined by the light-distribution adjusting mechanism, on a basis of a control value calculated by multiplying the detected bank angle by a multiplication factor that varies depending on whether the motorcycle is banked leftwards or rightwards. This is particularly advantageous in that in the case of the left-hand traffic system employed in Japan or some other countries, selection of the smaller multiplication factor to be used during the rightward cornering of the motorcycle than that during the leftward cornering of the motorcycle is effective to suppress the distribution of light from the headlamp module towards the area of the road surface rightwardly and forwardly further away from the motorcycle to thereby avoid the possibility that the rider of the oncoming vehicle on the opposite lane will be dazzled.

In the headlight device according to any one of the aspects of the present invention, the light-distribution controller is preferably operable to set a speed, at which the region of illumination is changed by the light-distribution adjusting mechanism, on a basis of a deviation value calculated by subtracting an actual amount of change from a target amount of change. More preferably, the speed is set to a value calculated by multiplying a value, obtained by squaring the deviation value, by a multiplication factor. According to this structural feature, since the light-distribution adjusting mechanism is activated at a high changing speed when the target amount of change is large, but at a low changing speed when the target amount of change is small, the region of illumination can be changed at a high speed when the motorcycle is banked with legerity, but at a low speed when the motorcycle is banked slowly, and, therefore, the light-distribution adjusting mechanism can be smoothly driven without incurring any frequent repetition of start and halt.

In the headlight device according to any one of the aspects of the present invention, the light-distribution controller is preferably operable to control the light-distribution adjusting mechanism in such a way that when change of the region of illumination is halted, a start is inhibited a predetermined time passes subsequent to the halt of the change of the region of illumination. According to this structural feature, not only can the durability of a drive unit of the light-distribution adjusting mechanism be increased, but occurrence of slippage can also be prevented since repetition of start and halt of the light-distribution adjusting mechanism at a short cycle can be avoided.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Preferred embodiments of the present invention will now be described in detail with reference to the accompanying drawings.

Figure 1:
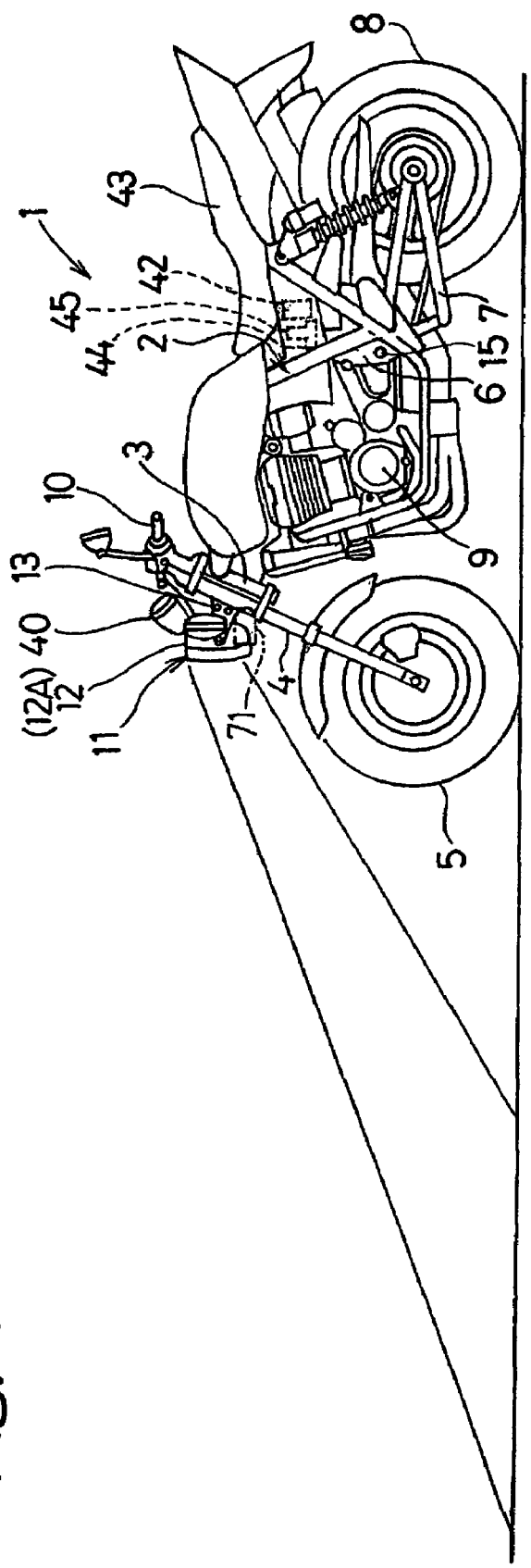
FIG. 1 is a side view of a motorcycle equipped with a headlight device according to a first preferred embodiment of the present invention.

Referring to FIG. 1, showing a side view of a motorcycle equipped with a headlight device according to a first preferred embodiment of the present invention, the motorcycle 1 shown therein includes a motorcycle frame 2 having a head pipe 3 secured to a front end thereof. The head pipe 3 rotatably supports a front fork 4 having left and right fork members, with a front wheel 5 being rotatably supported by respective lower ends of the left and right fork members. The motorcycle frame 2 also includes swingarm brackets 6 at a middle lower portion thereof, with which a swingarm 7 is connected through a pivot pin 15 for pivotal movement up and down about the pivot pin 15. This swingarm 7 carries a rear drive wheel 8 rotatably supported by a rear end thereof. A motorcycle combustion engine 9 is mounted on the motorcycle frame 2 at an intermediate lower portion thereof and is drivingly coupled with the rear wheel 8 by means of a substantially endless drive chain. A steering handlebar 10 is mounted on an upper end of the front fork 4 for maneuvering the motorcycle 1.

In any event, the motorcycle of the structure so far described may be of any known construction and, therefore, the details thereof are not reiterated for the sake of brevity.

The front fork 4 is provided with a headlight bracket 13 supporting a headlamp module 12, forming a part of a headlight device 11. As shown in a block circuit diagram in FIG. 3, in addition to the headlamp module 12 having a drive unit 18 and an encoder 29, the headlight device 11 includes a bank angle detecting unit 19 and a light-distribution controller 20.

Figure 2:
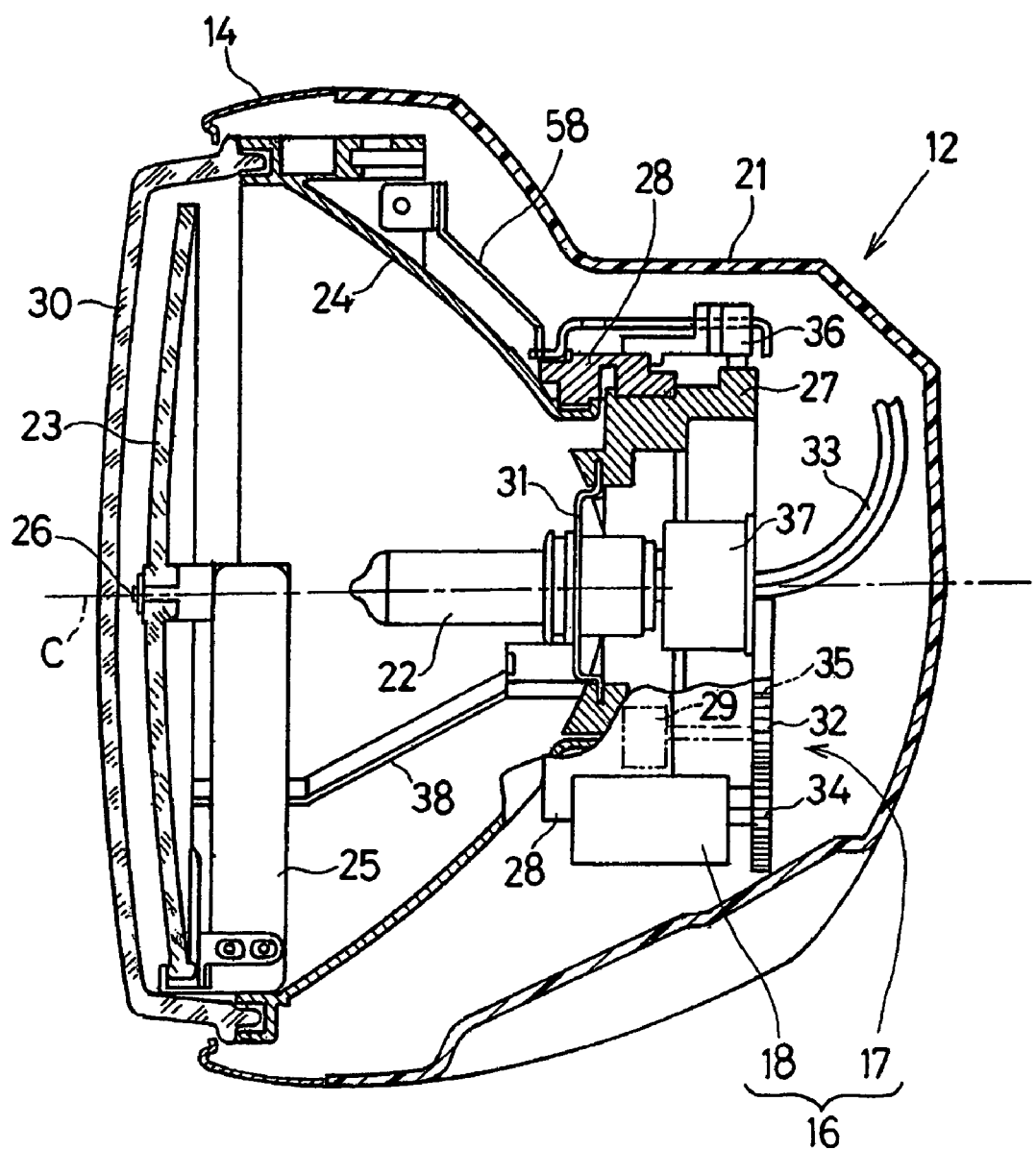
FIG. 2 is a longitudinal sectional view, on an enlarged scale, of the headlight device.

FIG. 2 illustrates a longitudinal sectional view of the headlamp module 12 on an enlarged scale. As shown therein, the headlamp module 12 includes a headlight casing 21, a light emitting element in the form of a bulb 22 disposed inside the headlight casing 21, and a lens 23 disposed in face-to-face relation with the bulb 22. A combination of the bulb 22 with the lens 23, forming an illuminating region changing mechanism 17, is supported rotatably about a center axis C thereof.

Specifically, the headlamp module 12 includes an annular rim member 14, to which a front edge portion of the headlight casing 21 is fitted by means of a plurality of set screws (not shown). A generally bowl-shaped reflector 24 for reflecting rays of light from the bulb 22 towards the lens 23 and then to the outside of the headlight casing 21 is fitted to the annular rim member 14 by means of hooks and set screws (both not shown) while disposed inside the headlight casing 21 so as to surround the bulb 22. The lens 23 referred to above is supported by a rotary spindle 26 of an elongated lens support 25, mounted fixedly on the reflector 24, for rotation about the rotary spindle 26. A rotary base 27 is arranged in a center area of the reflector 24 in coaxial relation with the lens 23, and the bulb 22 referred to above is fitted to a center portion of the rotary base 27 through a bulb bracket 31 in coaxial relation with the center axis C.

The rotary base 27 is rotatably supported by a fixed base 28 positioned substantially radially outwardly of the rotary base 27 and the fixed base 28 is in turn supported by the reflector 24 through a bracket 58. The rotary base 27 and an outer peripheral portion of the lens 23 are connected with each other by means of an arm 38 extending therebetween. Accordingly, that combination of the bulb 22 and the lens 23 is rotatable relative to the headlight casing 21, the annular rim 14 and the reflector 24. A front transparent cover 30 is fitted to a front edge portion of the reflector 24. As a matter of design, a bulb socket 37 for receiving therein a mouthpiece of the bulb 22 to support the latter is positioned rearwardly of the bulb 22 and has an electric power supply cable 33.

A portion of an outer periphery of the rotary base 27 is formed with an arcuately extending driven gear segment 32, which extends approximately 180° about the enter axis C of rotation thereof, and, on the other hand, an outer peripheral portion of the fixed base 28 has a drive unit 18 mounted thereon for driving the rotary base 27. The drive unit 18 is in the form of, for example, a DC drive motor. The outer peripheral portion of the fixed base 28 is also provided with an encoder 29 for detecting the angle of rotation of the rotary base 27 and, hence, the angle of rotation of the combination of the lens 23 and the bulb 22. The encoder 29 is positioned at a location spaced circumferentially from the drive unit 18. This drive unit 18 is drivingly coupled with the rotary base 27 through a round drive gear 34 and then through the driven gear segment 32 integral with the rotary base 27 and, accordingly, when the drive unit 18 is activated, the combination of the lens 23 and the bulb 22 can be turned about the center axis C. It is to be noted that the drive unit 18 and the illuminating region changing mechanism 17 referred to previously constitute a light-distribution adjusting mechanism 16.

The encoder 29 has a round transmission gear 35 that is meshed with the driven gear segment 32 and can therefore undergo a rotation to detect the number of revolutions or angle of rotation of the drive unit 18 and, in turn, to detect the angle of rotation of the combination of the lens 23 and the bulb 22 based on the detected number of revolutions or angle of rotation of the drive unit 18. The transmission gear 35 has the number of gear teeth equal to that of the drive gear 34 and can therefore rotate in a number of revolutions equal to that of the drive gear 34.

The fixed base 28 has a limit switch 36 fitted thereto for halting the drive unit 18 when the angle of rotation of the rotary base 27 is detected as exceeding a predetermined range of angle. Electric power supply cables or signal transmission cables connected with the drive unit 18, the encoder 29 and the limit switch 36, as well as the electric power supply cable 33 for the bulb 22, are led out of the headlight casing 21 through a cable lead-out hole (not shown) defined in the headlight casing 21.

Figure 18:
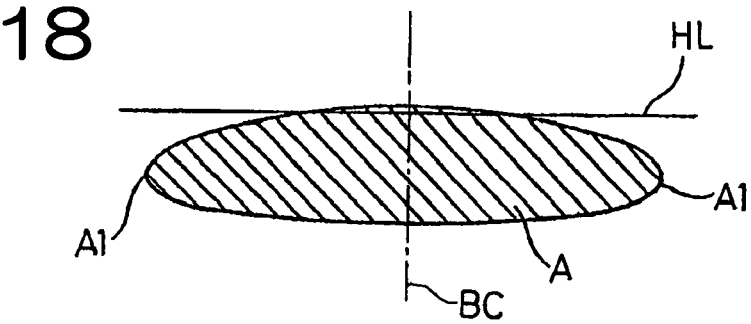
FIG. 18 is a schematic diagram showing the forward field of view available to the motorcycle rider during the straight forward drive at night.

The lens 23 and the bulb 22 are so designed as to exhibit such a light distributing characteristic that when the angle of rotation is zero, that is, when the rotary base 27 (or the combination of the lens 23 and the bulb 22) is held at a neutral position, the region of illumination A spreads leftward and rightward along the horizontal datum line HL as shown in FIG. 18. This region of illumination A exhibited is substantially similar to that afforded by the conventional motorcycle headlight device and can be obtained when, for example, a light adjusting plate for adjusting the direction of emission of light from the bulb 22 is provided in the bulb 22 and a front or rear surface of the lens 23 is formed integrally with a multiplicity of cylindrical lenslets or Fresnel lenslets. Although in the illustrated embodiment the lens 23 is employed in the form of a scattering lens, the present invention is not always limited to the use of the scattering lens.

Figure 3:
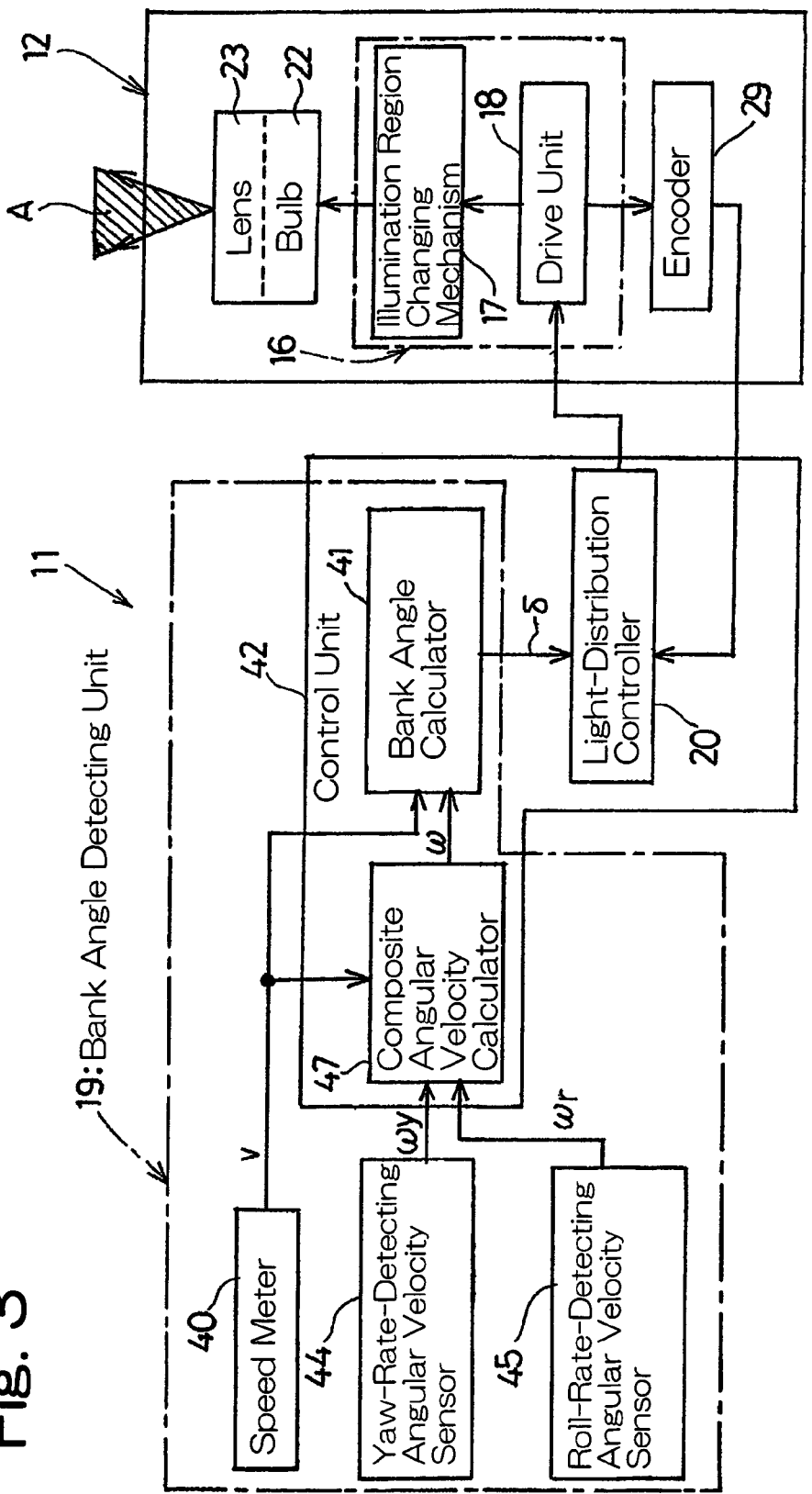
FIG. 3 is a block circuit diagram showing an electric circuitry for the headlight device.

The bank angle detecting unit 19 shown in FIG. 3 is operable to detect the bank angle δ of the motorcycle 1 (shown in FIG. 1), that is, the angle of tilt of the motorcycle in either leftward or rightward direction relative to the vertical datum line. In the illustrated embodiment, the bank angle detecting unit 19 is operable to determine a composite angular velocity ω by compositing the angular velocity ωy (generally referred to as the yaw rate) about the vertical axis of the motorcycle, the angular velocity ωr (generally referred to as the roll rate) about the longitudinal axis of the motorcycle and then to calculate the bank angle δ in reference to the composite angular velocity ω and the motorcycle traveling velocity v.

The bank angle detecting unit 19 employed in the illustrated embodiment includes a yaw-rate-detecting angular velocity sensor 44, which is operable to measure the angular velocity about the vertical axis of the motorcycle, a roll-rate-detecting angular velocity sensor 45, which is operable to measure the angular velocity ωr about the longitudinal axis of the motorcycle, a speedometer 40 for measuring the motorcycle traveling velocity v, a composite angular velocity calculator 47 for compositing the rotatory angular velocities ωy and ωr referred to above for calculating the composite angular velocity δ and a bank angle calculator 41 for calculating the bank angle δ of the motorcycle in reference to the calculated composite angular velocity ω and the measured motorcycle traveling velocity v.

The composite angular velocity calculator 47, the bank angle calculator 41, both included in the bank angle detecting unit 19, and the light-distribution controller 20, are built in a control unit 42 for controlling various operations of the motorcycle in its entirety. The light-distribution controller 20 is operable to control the drive unit 18 of the light-distribution adjusting mechanism 16 on the basis of the bank angle δ calculated by the bank angle calculator 41 so that the combination of the lens 23 and the bulb 22 can be turned from the neutral position an angle proportional to the bank angle δ of the motorcycle in a direction counter to the direction in which the motorcycle tilts. The details thereof will be described later.

As best shown in FIG. 1, the control unit 42 is mounted on the motorcycle at a location below a motorcycle seat 43 generally arranged in an intermediate portion of the motorcycle frame 2. The yaw rate detecting angular velocity sensor 44 is horizontally fitted to a rear portion of the motorcycle frame 2 so that it can rotate about the vertical axis of the motorcycle. On the other hand, the roll rate detecting angular velocity sensor 45 is vertically fitted to a portion of the motorcycle frame 2 below the motorcycle seat 43 so that it can rotate about the longitudinal axis of the motorcycle. The speedometer 40 is mounted on the motorcycle frame 2 at a location above the headlamp module 12.

The operation of the bank angle detecting unit 19 to detect the bank angle δ will now be described. In the first place, the composite angular velocity calculator 47 referred to above operates in the following manner to calculate the composite angular velocity ω. Specifically, assuming that the motorcycle traveling velocity measured by the speedometer 40 shown in FIG. 3 during the cornering is expressed by v, the angular velocity about the vertical axis of the motorcycle measured by the yaw rate detecting angular velocity sensor 44 is expressed by ωy and the angular velocity about the longitudinal axis of the motorcycle measured by the roll rate detecting angular velocity sensor 45 is expressed by ωr, the composite angular velocity ω can be calculated by the following equation:

$$\omega = Ky \cdot \omega y + Kr \cdot \omega r \tag{1}$$

In the equation (1) above, Ky and Kr represent respective correction coefficients that are variably set in dependence on the motorcycle traveling velocity v. In general, the correction coefficient Ky is set to 1.0 and the correction coefficient Kr is set to a value exceeding zero and smaller than 1.0, and decreasing with increase of the motorcycle traveling velocity v. This is because of the following reason.

If the motorcycle traveling velocity v increases, the handlebar 10 cannot be acutely maneuvered and, therefore, in such case, the angular velocity ωy about the vertical axis of the motorcycle will become small, but the angular velocity ωr about the longitudinal axis of the motorcycle maintains at a substantially constant value. In order to secure the balance between the angular velocity ωr and the angular velocity ωy, any possible influence brought about by the angular velocity ωr about the longitudinal axis of the motorcycle with increase of the motorcycle traveling velocity is preferred to be minimal.

It is, however, to be noted that the correction coefficients Ky and Kr may be fixed to a constant value having no relation with the motorcycle traveling velocity. By so doing, a control program can be simplified. In this way, the composite angular velocity ω so calculated can be regarded as the angular velocity about the vertical axis of the motorcycle so that the bank angle δ of the motorcycle can be calculated.

Figure 5:
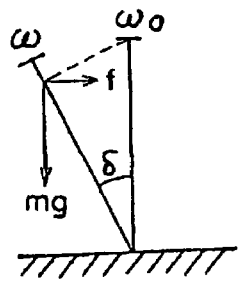
FIG. 5 is a vector diagram showing the manner, in which the bank angle of the motorcycle is calculated by a bank angle calculator employed in the headlight device.
Figure 6:
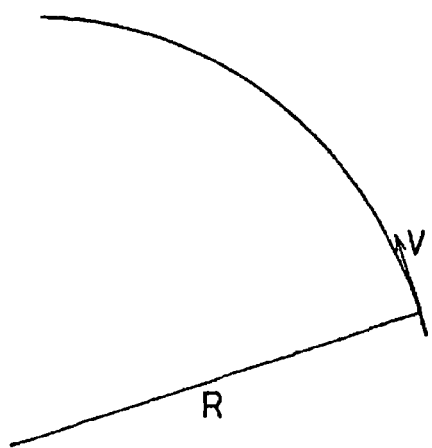
FIG. 6 is a schematic top plan view showing the radius of turn and the velocity during the cornering of the motorcycle.

Subsequently, the bank angle calculator 41 calculates the bank angle δ of the motorcycle in the following manner. Specifically, assuming that the radius of turn of the motorcycle is expressed by R, the gravitational acceleration is expressed by g, and the angular velocity of the motorcycle within the horizontal plane is expressed by ω0 as shown in FIGS. 5 and 6, the yaw rate ω1 at the bank angle δ can be expressed by the following equation:

$$\omega 1 = \omega 0 \cdot \cos \delta \tag{2}$$

The yaw rate ω1 so calculated according to the equation (2) above is regarded as the composite angular velocity ω. Accordingly;

$$\omega = \omega 1 = \omega 0 \cdot \cos \delta \tag{2}$$

On the other hand, the centrifugal force f acting on the motorcycle can be expressed by the following equation (3) when the mass of the motorcycle is expressed by m. It is to be noted that the mass of the motorcycle referred to above is a total mass including the mass of the motorcycle and the mass of the motorcycle rider.

$$f = m \cdot v \cdot v / R \tag{3}$$

Since the angular velocity ω referred to above can be expressed;

$$\omega 0 = v/R \tag{4}$$

substituting the equation (4) into the equation (3) results in the following centrifugal force f acting on the motorcycle:

$$f = m \cdot v \cdot \omega 0 \tag{5}$$

Also, when the bank angle of the motorcycle is δ, the following relation expressed by the equation (6) establishes between the centrifugal force f acting on the motorcycle and the gravitational force m·g:

$$\tan \delta = f/(m \cdot g) \tag{6}$$

Accordingly, substituting the equation (5) into the equation (6) results in:

$$\tan \delta = m \cdot v \cdot \omega 0 / (m \cdot g) \tag{7}$$
$$= v \cdot \omega 0 / g$$

The equation (7) can be modified as follows when the parameter ω0 in the equation (2) above is substituted:

$$\tan \delta = v \cdot \omega / (g \cdot \cos \delta) \tag{8}$$

From the equation (8), the relation expressed by the following equation (9) can be obtained:

$$\sin \delta = v \cdot \omega / g \tag{9}$$

Accordingly, the bank angle δ of the motorcycle can be expressed as follows:

$$\delta = \sin^{-1}(v \cdot \omega / g) \tag{10}$$

The bank angle calculator 41 shown in FIG. 3 calculates the bank angle δ of the motorcycle by inputting the composite angular velocity ω, which is calculated by the composite angular velocity calculator 47, and the traveling velocity v, which is measured by the speedometer 40, to the equation (10) above.

The operation of the motorcycle headlight device 11 of the structure described hereinabove will now be described. When the motorcycle traveling at night makes the curve, i.e., corners in a leftward direction relative to the direction of straight forward run thereof, the composite angular velocity calculator 47 built in the control unit 42 calculates the composite angular velocity ω on the basis of the angular velocity ωy about the vertical axis of the motorcycle, which is measured by the yaw rate detecting angular velocity sensor 44, the angular velocity ωr about the longitudinal axis of the motorcycle, which is measured by the roll rate detecting angular velocity sensor 45, and the motorcycle traveling velocity v measured by the speedometer 40, relying on the equation (1) discussed above. Also, the bank angle calculator 41 built in the control unit 42 calculates the motorcycle bank angle δ relying on the equation (10) discussed above. The light-distribution controller 20 similarly built in the control unit 42 controls the drive unit 18 based on the calculated motorcycle bank angle δ.

In this way, the combination of the lens 23 and the bulb 22 is turned in a direction counter to the direction, in which the motorcycle is banked, to thereby swing the region of illumination (light distribution) A in a direction counter to the direction of tilt of the motorcycle an angle corresponding to the motorcycle bank angle δ so calculated. When the amount of revolution of the drive unit 18 detected by the encoder 29 attains a value corresponding to the motorcycle bank angle δ, the light-distribution controller 20 responds thereto to halt the drive unit 18. Accordingly, the region of illumination A can be turned an angle corresponding to the motorcycle bank angle δ in a direction counter to the direction of tilt of the motorcycle, i.e., counter to the direction in which the motorcycle banks.

Figure 7:
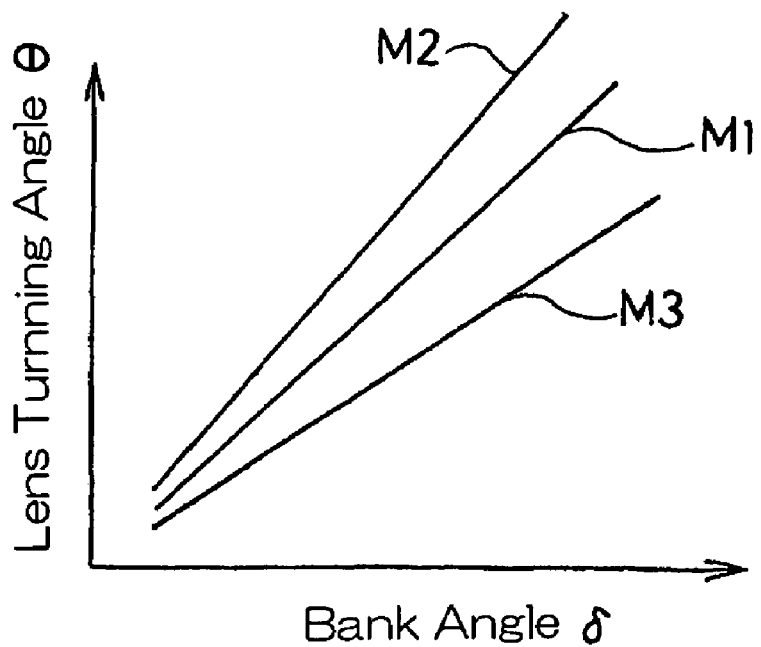
FIG. 7 is a characteristic chart showing the relation between the angle of turn of a lens and the bank angle in the headlight device.

FIG. 7 illustrates a characteristic chart showing the relation between the measured motorcycle bank angle δ and the angle θ of turn of the combination of the lens 23 and the bulb 22. In this chart, the rotation angle θ of the combination of the lens 23 and the bulb 22 is set to a value, which is 1.7 to 2.0 times the motorcycle bank angle δ as shown by the line M1. The rotation angle θ of the combination of the lens 23 and the bulb 22 is preferably within the range of 1.0 to 3.0 times the motorcycle bank angle δ. Specifically, it appears proper that the rotation angle θ of the combination of the lens 23 and the bulb 22 is of a value 1.7 times the motorcycle bank angle δ during normal run of the motorcycle, but of a value 2.0 times the motorcycle bank angle δ during a motorcycle racing at which the motorcycle bank angle δ tends to be large.

It is to be noted that the rotation angle θ of the combination of the lens 23 and the bulb 22 is preferably limited to a value equal to or smaller than 55°. If the rotation angle θ exceeds the upper limit of 55°, left and right side portions A1 of the pattern of illumination in the region A shown in FIG. 8 will come close to the mid-center plane BC of the widthwise direction of the motorcycle and, therefore, illumination in a left forward direction when the motorcycle is banked leftwards during the cornering, or in a right forward direction when the motorcycle is banked rightwards during the cornering, will become insufficient.

The multiplication factor, with which the motorcycle bank angle δ referred to above is multiplied to calculate the rotation angle θ, may be set to different values for the leftward cornering and the rightward cornering, respectively. In the case of the left-hand traffic system employed in Japan or some other countries, if the multiplication factor is large, an area of the road surface rightwardly and forwardly further away from the motorcycle will be illuminated during the rightward cornering, which may result in that a rider of an oncoming vehicle on the opposite lane will be dazzled. Accordingly, the multiplication factor is, for example, chosen to be a relatively large value, as shown by the line M2 in FIG. 7, during the leftward cornering and to be a relatively small value, as shown by the line M3 in FIG. 7, during the rightward cornering. By so doing, during the rightward cornering, distribution of light from the headlamp module towards the area of the road surface rightwardly and forwardly further away from the motorcycle can be suppressed to avoid the possibility that the rider of the oncoming vehicle on the opposite lane will be dazzled.

Figure 8:
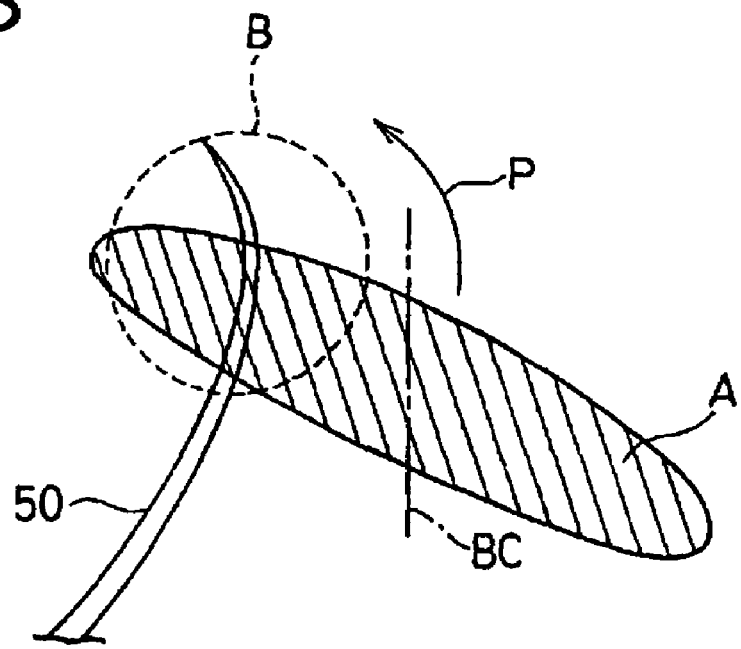
FIG. 8 is a schematic diagram showing a pattern of distribution of illumination cast by the headlight device during the cornering of the motorcycle.
Figure 19:
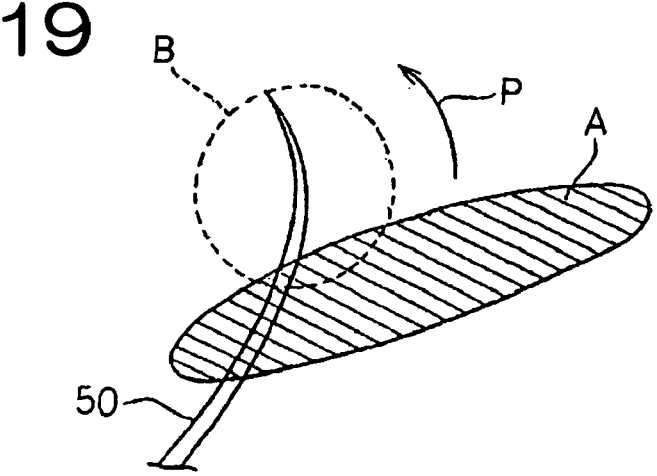
FIG. 19 is a schematic diagram showing the forward field of view available to the motorcycle drive with the prior art headlight device during the cornering.

As described above, when the motorcycle is ready to advance leftwards along a curved lane 50 in a direction shown by the arrow-headed line P in FIG. 8, the region of illumination A afforded by the headlight device 11, when viewed from top of the motorcycle, changes from the pattern, in which the illuminating region A extends leftwards and rightwards along the horizontal datum line HL during the straight forward run of the motorcycle as shown in FIG. 18, to a pattern, in which the illuminating region A extends somewhat leftwardly upwardly as shown in FIG. 8. As a result, much more light than that afforded with the conventional headlight device as shown in FIG. 19 can be distributed in an area B of the rider's sight defined inwardly of the direction of cornering, which is encompassed by the broken circle in FIG. 8, allowing the motorcycle rider to enjoy better visibility. It is to be noted that depending on the shape of the illuminating region A, it may occur that the illuminating region A may be turned an angle corresponding to the motorcycle bank angle δ in a direction, not counter to, but identical with the direction in which the motorcycle is banked, to thereby distribute an increased amount of light in an area of the rider's sight defined inwardly of the direction of cornering.

Moreover, since in the illustrated embodiment described above, the motorcycle bank angle δ is calculated on the basis of the motorcycle traveling velocity v, and the composite angular velocity ω in which the angular velocity ωy about the vertical axis of the motorcycle and the angular velocity ωr about the longitudinal axis of the motorcycle are combined together, calculation of the motorcycle bank angle δ can be initiated in good time matching with the start of cornering of the motorcycle.

Figure 4:
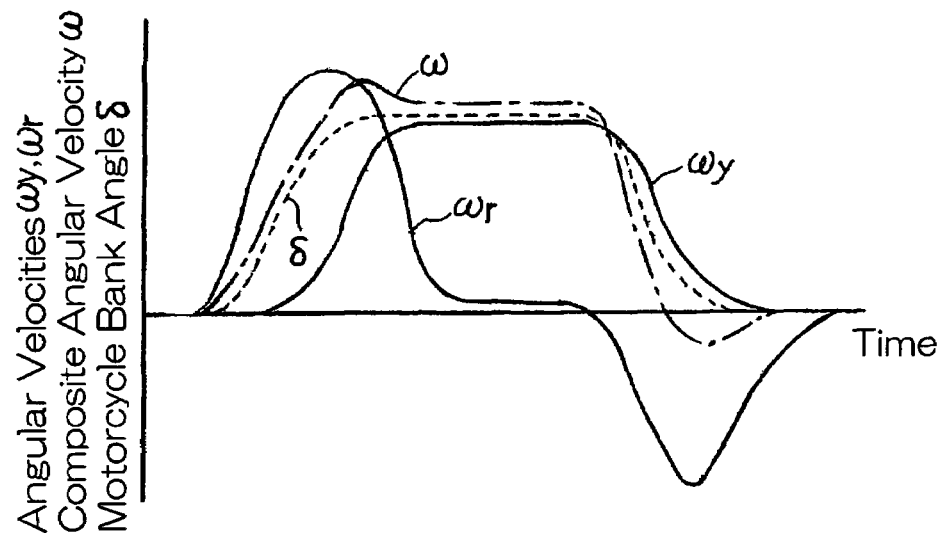
FIG. 4 is a characteristic chart showing various angular velocities about a vertical axis of the motorcycle and about a longitudinal axis of the motorcycle, the composite angular velocity and the bank angle of the motorcycle relative to time.

In other words, during the motorcycle cornering, since the motorcycle rider tilts the motorcycle, followed by turning the handlebar 10 (shown in FIG. 1) in a direction in which he or she wishes to turn, as shown in FIG. 4, the angular velocity ωy about the vertical axis of the motorcycle increases in a fashion delayed for a moment relative to increase of the motorcycle bank angle δ, which results from tilting of the motorcycle, and the angular velocity ωr about the longitudinal axis of the motorcycle increases somewhat quicker than increase of the motorcycle bank angle δ. In view of this, in the headlight device 11 of this embodiment best shown in FIG. 3, the composite angular velocity ω, in which the angular velocity ωy about the vertical axis of the motorcycle and the angular velocity ωr about the longitudinal axis of the motorcycle are combined together, is calculated and this calculated composite angular velocity ω is utilized as the angular velocity about the vertical axis of the motorcycle for the calculation of the motorcycle bank angle δ. By so doing, the delay of the angular velocity ωy about the vertical axis of the motorcycle is corrected with the angular velocity ωr about the longitudinal axis of the motorcycle.

Accordingly, the composite angular velocity ω can correspond substantially to the motorcycle bank angle δ without being delayed relative to the motorcycle bank angle δ. Therefore, the headlight device 11 shown in and described with particular reference to FIG. 3 is effective in that turn of the headlamp module 12 can be initiated in good time without being delayed from the start of tilting of the motorcycle even during the initial stage at which the cornering starts, resulting in that the distribution of light from the headlamp module 12 is sufficient to provide a large field of view to the motorcycle rider. In particular, meritorious effects can be obtained where the motorcycle is required to be maneuvered with legerity such as occurring during traveling in, for example, a zigzag course.

It is to be noted that although in the foregoing first embodiment of the present invention, the combination of the lens 23 and the bulb 22 shown in FIG. 2 has been described as being turned an angle corresponding to the magnitude of the motorcycle bank angle δ, the reflector 24, for example, may be turned particularly where the reflector 24 is so designed as to have a light distributing capability.

Also, in a modification of the foregoing first embodiment, the standard headlamp module of a fixed type, in which the light-distribution adjusting mechanism 16 is eliminated from the headlamp module 12 shown in FIG. 2, is used as a principal headlamp unit 12A, to which left and right auxiliary headlamp units 71 shown by the double dotted line in FIG. 1 are added to form the headlight device 11. The left auxiliary headlamp unit 71 is so designed that the illumination afforded by the left auxiliary headlamp unit 71 can reach further leftward away from the motorcycle than the illumination afforded by the principal headlamp unit 12A whereas the illumination afforded by the right auxiliary headlamp unit (not shown) can reach further rightward away from the motorcycle than the illumination afforded by the principal headlamp unit 12A. Accordingly, without modifying the region of illumination of the principal headlamp unit 12A, one of the left and right auxiliary headlamp units, depending on the direction of tilt of the motorcycle, is turned on to expand the region of illumination so as to illuminate further away from and inwardly of the turning direction of the motorcycle.

In other words, in the event that the bank angle δ detected of the motorcycle then cornering leftwards exceeds the predetermined value, the left auxiliary headlamp unit 71 is lit to expand the region of illumination to reach further away from the motorcycle in the leftward direction, whereas in the event that the bank angle detected of the motorcycle then cornering rightwards exceeds the predetermined value, the right auxiliary headlamp unit is lit to expand the region of illumination to reach further away from the motorcycle in the rightward direction.

Figure 9:
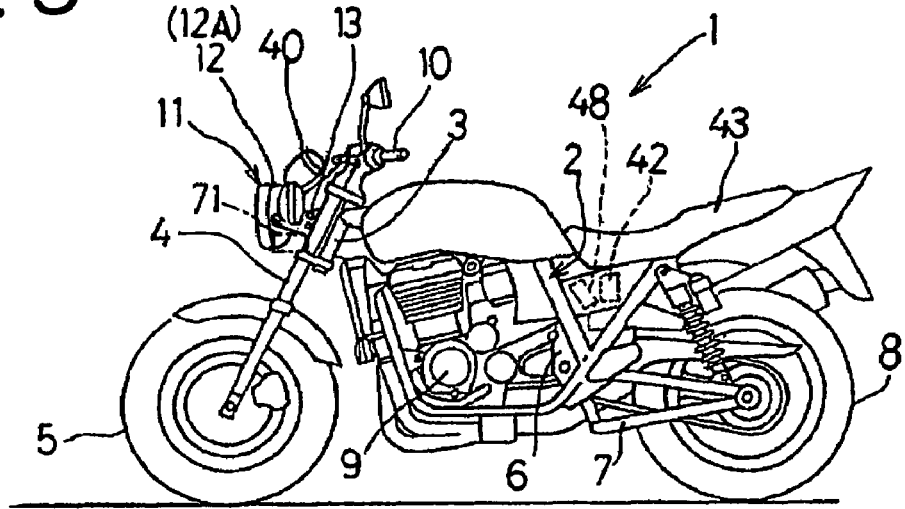
FIG. 9 is a side view of a motorcycle equipped with a headlight device according to a second preferred embodiment of the present invention.

FIG. 9 illustrates a side view of a motorcycle equipped with a headlight device according to a second preferred embodiment of the present invention. This second embodiment is substantially similar to the previously described first embodiment of the present invention, except that in place of the yaw rate detecting angular velocity sensor 44 and the roll rate detecting angular velocity sensor 45 both employed in the first embodiment, a uniaxial angular velocity sensor 48 is employed and is so arranged as to incline relative to both of the vertical and longitudinal axes of the motorcycle. Other structural features of the second embodiment than those specified are substantially similar to those shown in and described in connection with the headlight device according to the first embodiment and, therefore, the details thereof are not reiterated for the sake of brevity.

Figure 10:
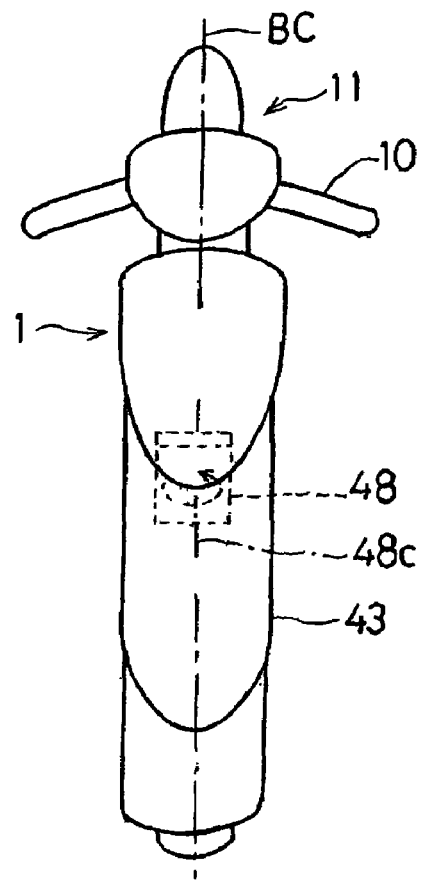
FIG. 10 is a schematic top plan view of the motorcycle shown in FIG. 9.
Figure 11:
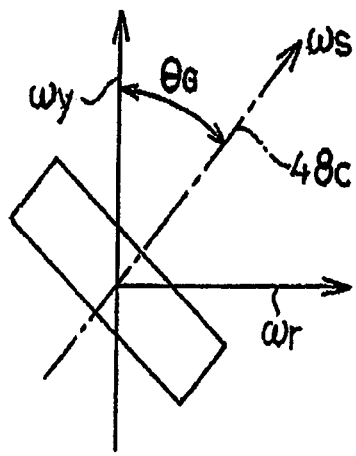
FIG. 11 is a vector diagram showing the manner in which the composite angular velocity is calculated by a composite angular velocity calculator.

As shown in FIG. 10, the uniaxial angular velocity sensor 48 referred to above has its own axis 48c positioned at a point intermediate of the widthwise direction of the motorcycle contained in the mid-center plane BC of the motorcycle and is, as best shown in FIG. 9, arranged at a location below the motorcycle seat 43 in a forwardly upwardly oriented fashion inclined rearwardly downwardly relative to the vertical axis of the motorcycle. Accordingly, the uniaxial angular velocity sensor 48 is capable of measuring the angular velocity corresponding to the composition of the angular velocity ωy about the vertical axis of the motorcycle and the angular velocity ωr about the longitudinal axis of the motorcycle. In other words, as shown in FIG. 11, the composite angular velocity ωs measured by and outputted from the uniaxial angular velocity sensor 48 can be expressed by the following equation (11) if the angle of inclination of this uniaxial angular velocity sensor 48 is expressed by $\theta_G$:

$$\omega s = \omega y \cdot \cos \theta_G + \omega r \cdot \sin \theta_G \quad (11)$$

Figure 12:
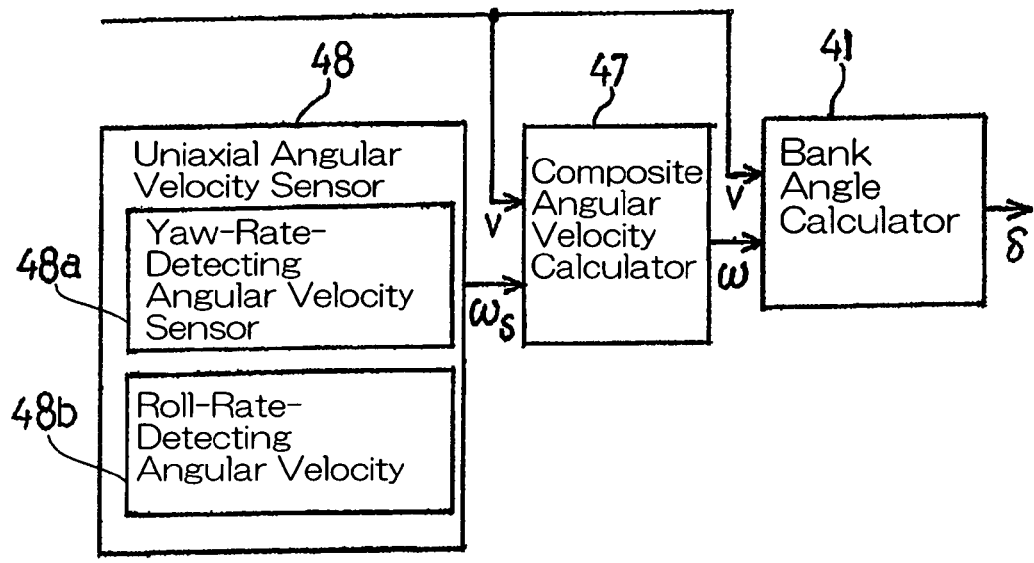
FIG. 12 is a block circuit diagram showing an electric circuitry used in the headlight device according to the second embodiment of the present invention.

Accordingly, as shown in FIG. 12, the uniaxial angular velocity sensor 48 includes a yaw rate detector 48a and a roll rate detector 48b, which respectively correspond in function to the yaw rate detecting angular velocity sensor 44 and the roll rate detecting angular velocity sensor 45 both shown in FIG. 3 and employed in the previously described first embodiment.

Although the uniaxial angular velocity sensor 48 referred to above may be mounted at, in place of the specified location of the motorcycle described above, any desired location of the motorcycle, it is necessary that the uniaxial angular velocity sensor 48 be arranged in the specific fashion with the angle of inclination $\theta_G$ of the sensor axis 48c relative to the vertical axis of the motorcycle set to a proper value, in order to obtain the composite angular velocity ωs in which the angular velocity ωy about the vertical axis of the motorcycle and the angular velocity ωr about the longitudinal axis of the motorcycle are properly combined.

The angle $\theta_G$ of inclination of the sensor axis 48c relative to the vertical axis of the motorcycle is preferably so chosen as to be a value exceeding 0° and not greater than 45° and, more preferably, within the range of 20 to 30°. The range of 0 to 45° for the inclination angle $\theta_G$ corresponds to 0.7 ($\approx 1/\sqrt{2}$) <Ky<1.0, 0<Kr<0.7 ($\approx 1/\sqrt{2}$) in the equation (1) above.

Since the uniaxial angular velocity sensor 48 is a gyroscope capable of rotating leftwards (or rightwards) as viewed from front (from above the sheet of FIG. 1), and since the sensor axis 48c, about which the rotation takes place, is so arranged as to assume the forwardly upwardly oriented fashion having been inclined rearwardly downwardly relative to the vertical axis of the motorcycle as shown, the angular velocity ωy about the vertical axis of the motorcycle and the angular velocity ωr about the longitudinal axis of the motorcycle can be detected with the same sign at the time of start of the banking of the motorcycle and is therefore feasible. If the uniaxial angular velocity sensor 48 were to be mounted on the motorcycle with the sensor angle 48c so arranged as to assume a rearwardly upwardly oriented fashion having been inclined forwardly relative to the vertical axis of the motorcycle, which is substantially reverse to that shown and described, the angular velocity ωy about the vertical axis of the motorcycle will take a negative (minus) value, rendering the compositing calculation to be complicated. It is to be noted that although at the time of termination of the banking of the motorcycle, the angular velocities ωy and ωr will take a reverse sign as shown in FIG. 4, the motorcycle will smoothly gain its normal upright position at the exit of the curve, at which the banking terminates, and, therefore, influences brought about thereby are so minimum that they can be negligible.

Referring now to FIG. 12, the rotational angular velocity ωs detected by the uniaxial angular velocity sensor 48 is inputted to the composite angular velocity calculator 47 together with the traveling velocity v fed from the speedometer 40 shown in FIG. 3, so that the composite angular velocity calculator 47 calculates the composite angular velocity ω by multiplying the detected angular velocity ωs by a correction coefficient Ks. In general, the correction coefficient Ks is set to Ks=1/cos $\theta_G$ in order to correct a component of inclination of the gyroscope.

The composite angular velocity ω from the composite angular velocity calculator 47 is inputted to the bank angle calculator 41 together with the traveling velocity v, it being to be noted that the calculation performed by the bank angle calculator 41 is identical with that described in connection with the previously described first embodiment best shown in FIG. 3. In this way, even in the second embodiment, effects similar to those described in connection with the first embodiment can be obtained and, in addition thereto, as compared with the use of the two angular velocity sensors 44 and 45 such as in the previously described first embodiment, the structure can be simplified since only one uniaxial angular velocity sensor 48 is employed in the second embodiment.

Figure 13:
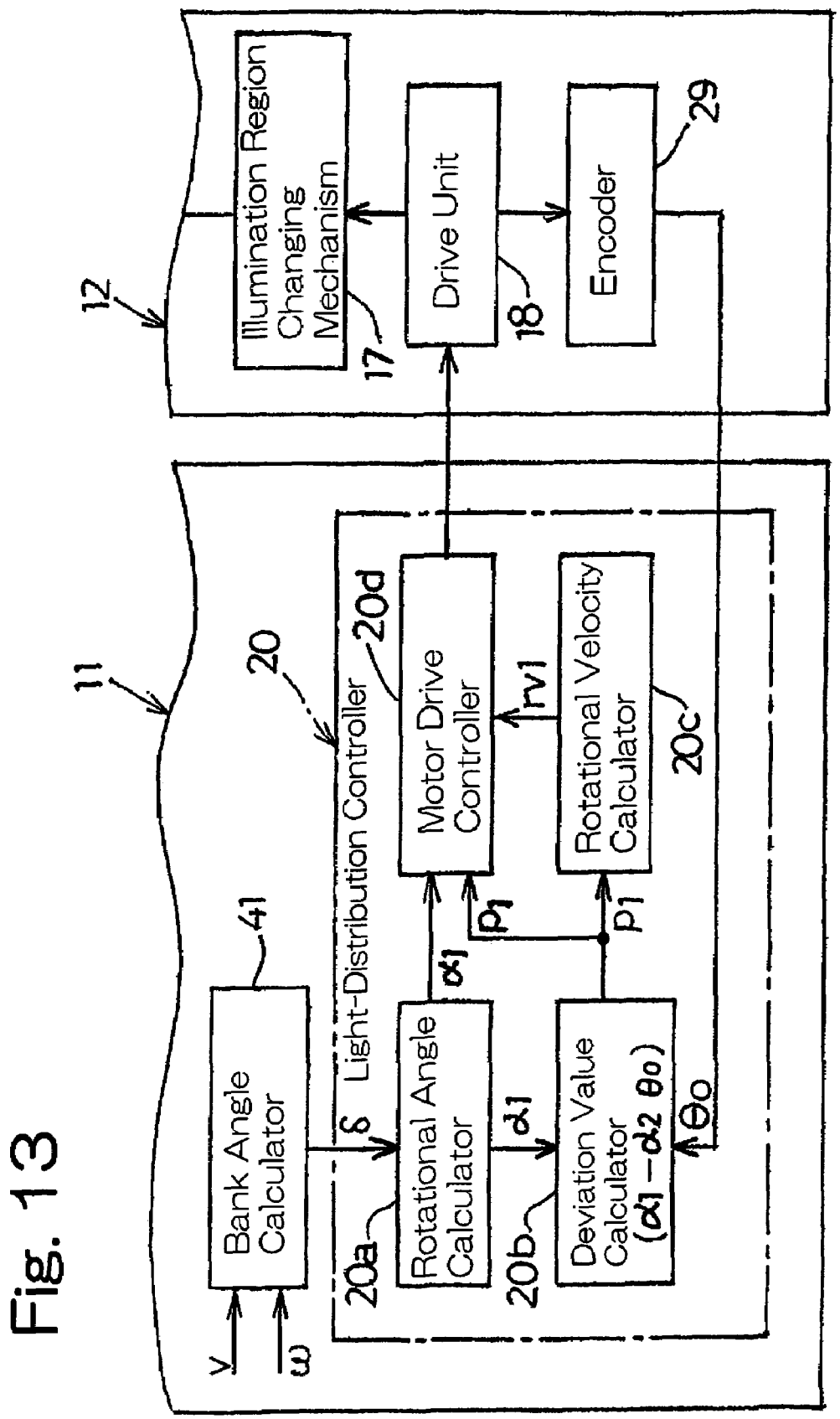
FIG. 13 is a block circuit diagram showing a portion of an electric circuitry used in a headlight device according to a third preferred embodiment of the present invention.

Referring now to FIG. 13, there is shown a block circuit diagram showing a principal portion of an electric circuitry employed in a headlight device according to a third preferred embodiment of the present invention. In this figure, the light-distribution controller 20 is operable to set the velocity of the change of the region of illumination, achieved by the light-distribution adjusting mechanism 16 to a value calculated by squaring a deviation value that is calculated by subtracting the actual amount of change from the target amount of change based on the bank angle δ inputted from the bank angle calculator 41. In other words, the light-distribution controller 20 includes a rotational angle calculator 20a and a deviation value calculator 20b. The rotational angle calculator 20a calculates a target rotational angle α1(°) (the angle of rotation of the drive unit 18 corresponding to a target rotational angle θ of the combination of the lens 23 and the bulb 22) of the drive unit 18, which is the target amount of change. The deviation value calculator 20b referred to above calculates a value of deviation p1 between the target rotational angle α1, calculated by the rotational angle calculator 20a, and an angle of rotation α2(°) (corresponding to the actual amount of change) of the drive unit 18, which is determined by multiplying the actual angle $\theta_0$ of rotation of the lens 23 (shown in FIG. 2), inputted from the encoder 29, by a reduction ratio. The light-distribution controller 20 also includes a rotational velocity calculator 20c for calculating a rotation speed rv1(°/sec.) of the drive unit 18 on the basis on the deviation value p1 calculated by the deviation value calculator 20b, and a motor drive control 20d for controlling the rotation of the drive unit 18 on the basis of the rotational velocity rv1, calculated by the rotational velocity calculator 20c, and the deviation value p1 and the rotational angle α1.

The light-distribution controller 20 is so designed that the rotational angle calculator 20a may calculate the target rotational angle α1 of the drive unit 18 on the basis of the bank angle δ inputted from the bank angle calculator 41; the deviation value calculator 20b may calculate the deviation value p1 (=α1−α2) by subtracting the actual rotational angle α2 of the drive unit 18, based on the detection by the encoder 29, from the target rotational angle α1; and the rotational velocity calculator 20c may calculate the rotational velocity rv1 of the drive unit 18 based on the equation, rv1=K1×(α1−α2)$^2$. The parameter K1 referred to above represents a velocity correction coefficient and may take a value within the range of 0.1 to 10, but preferably 0.5. Also, the motor drive control 20d of the light-distribution controller 20 performs a feedback control to drive the drive unit 18 at a rotational velocity rv1, calculated by the rotational velocity calculator 20c, in a direction of rotation determined based on the target rotational angle α1 inputted from the rotational angle calculator 20a and to halt the drive unit 18 when the deviation value p1, inputted from the deviation value calculator 120b, attains zero.

Considering that the drive unit 18 and, hence, the combination of the lens 23 and the bulb 22 are rotated at the rotational velocity rv1 calculated from the equation, rv1=K1×(α1−α2)$^2$, the drive unit 18 can be rotated at a high rotational velocity when the target rotational angle α1 is large, and at a low rotational velocity rv1 when the target rotational angle α1 is small. Specifically, when the motorcycle banks with legerity, the drive unit 18 can be rotated at a high speed in compliance with the motorcycle banking, the region of illumination cast from the bulb 22 quickly comes to be proper with no substantial delay, but when the motorcycle banks slowly, the drive unit 18 can be rotated at a low speed. Thus, the drive unit 18 and, hence, the combination of the lens 23 and the bulb 22 can be smoothly rotated without the movement taking place uncoordinatedly, which would otherwise occur when the drive unit 18 frequently repeats start and halt as a result of, for example, a rotatable drive performed at a constant rotational velocity. Such a rotation control is particularly effective where for the drive unit 18 a stepper motor is employed.

Even when at a small bank angle of the motorcycle, the drive unit 18 is driven at a low velocity as described above, it may be considered that the drive unit 18 may be repeatedly started and halted at an extremely short cycle. In view of this, the motor drive control 20d is provided with a functionality, in which during a predetermined (constant or variable) length of time subsequent to the halt of the drive unit 18 as a result of inputting of the deviation value p1, which is zero, a drive halt time of, for example, about 50 millisecond is counted so that during the drive halt time the drive unit 18 is inhibited from being driven, but the drive unit 18 can be started after passage of the drive halt time. By so doing, the cycle between the start and halt of the drive unit 18 can be prolonged and, therefore, reduction of the lifetime resulting from the frequently repeated start and halt of the drive unit 18 can be prevented. Also, where the stepper motor is employed for the drive unit 18, generation of slippage can also be prevented.

It is to be noted that the modification, in which the auxiliary headlamp units 71 (FIG. 1) are employed, is equally applicable even to any one of the second and third embodiments as is the case with the first embodiment.

Hereinafter, the headlight device according to a fourth preferred embodiment of the present invention will be described with particular reference to FIGS. 14 to 17. In particular, FIGS. 15A and 15B illustrate a motorcycle 1 having a two headlight system, in which a headlight device 11A includes two headlamp modules 51 arranged side-by-side fashion in a direction generally widthwise of the motorcycle 1. As shown in FIG. 15B, when the motorcycle having the two headlight system tilts during the cornering, the height of one of the headlamp modules 51, for example, the left headlamp module 51 above the road surface as shown by X decreases to a value lower than the height H of the headlamp module 51 assumed during the straight forward run with the motorcycle assuming an upright position as shown in FIG. 15A.

Figure 17:
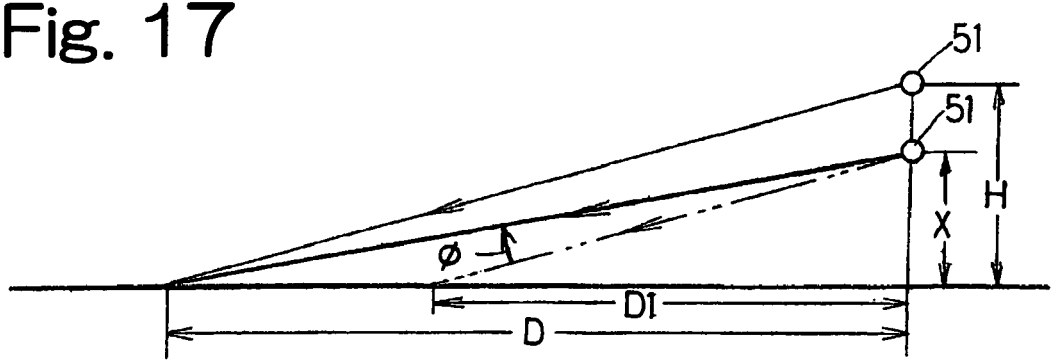
FIG. 17 is an explanatory diagram showing the manner in which the region of illumination cast by the headlamp module during the cornering.

For the reason discussed above, the distance of reach of the illumination from the headlamp module 51 when the motorcycle is banked represents a value D1 as shown in FIG. 17, which is smaller than the distance of reach D thereof exhibited during the straight forward run of the motorcycle, by a quantity corresponding to the difference between the heights H and X of the headlamp module 51 above the road surface, failing the headlamp module 51 to cast illumination sufficiently further away from the motorcycle. In view of this, in the fourth embodiment of the present invention, arrangement has been so made that when the height of the headlamp module 51 decreases during the cornering, the headlamp module 51 can be tilted upwardly an angle ø corresponding to the bank angle δ of the motorcycle. By so doing, the region of illumination A shown in FIG. 18 can be shifted further away from the motorcycle substantially in parallel to the mid-center plane BC of the motorcycle to render the distance of reach of the illumination during the cornering to be substantially equal to the distance of reach D of the illumination during the straight forward run of the motorcycle as shown by the solid line in FIG. 17.

Figure 14:
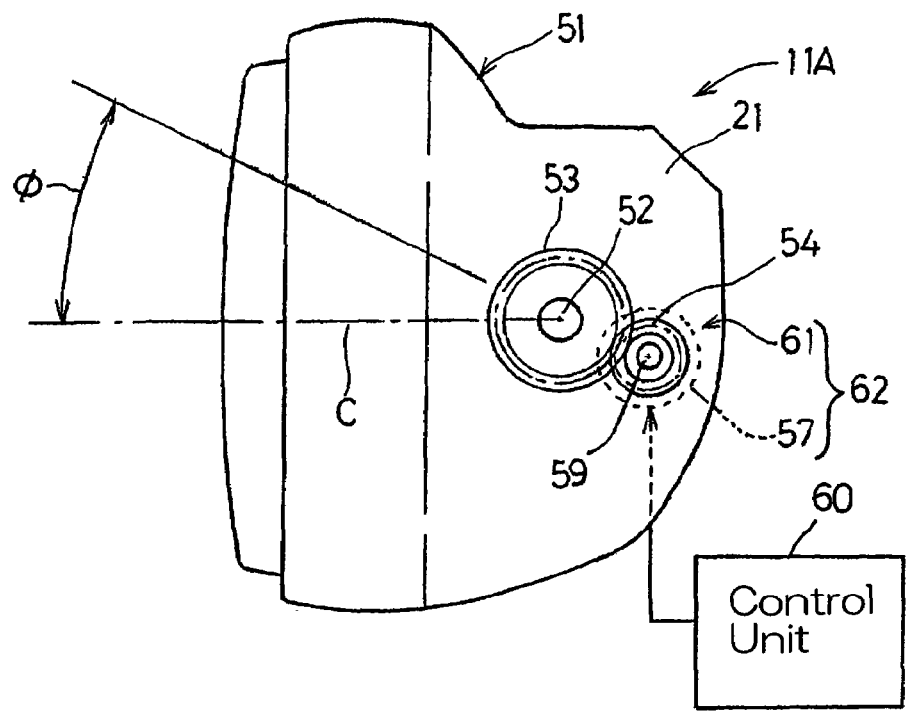
FIG. 14 is a schematic side view of a headlamp module employed in a headlight device according to a fourth preferred embodiment of the present invention.
Figure 15A:
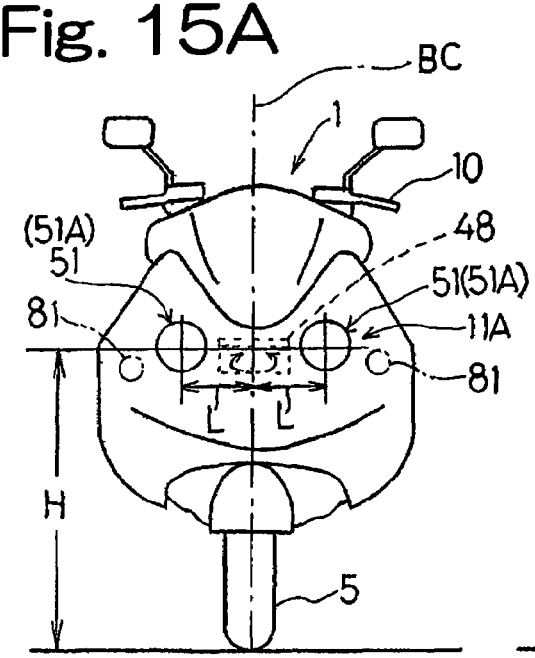
FIG. 15A is a schematic front elevational view of a motorcycle, showing the height of the headlamp module above the road surface during the straight forward run of the motorcycle.
Figure 15B:
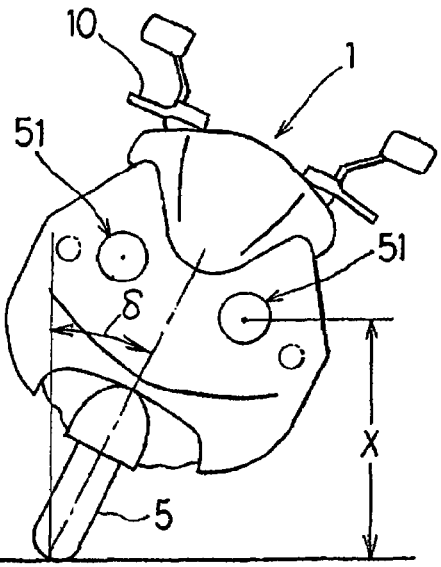
FIG. 15B is a schematic front elevational view of the motorcycle, showing the height of the headlamp module above the road surface during the cornering of the motorcycle.

Referring now to FIG. 14, showing a schematic side view of each of the headlamp modules 51 in the headlight device according to the fourth embodiment, the respective headlamp module 51 includes a bulb and a lens, similar to those shown in and descried with reference to FIG. 2, accommodated fixedly within the headlight casing 21 in coaxial relation with the center axis C. The headlight casing 21 is tiltably mounted on the headlight bracket 13 (See FIG. 1.) rigid with the motorcycle through rotary shafts 52 protrudingly provided on opposite side surfaces of the headlight casing 21 so that the headlamp module 51 can be turned up and down in a plane substantially parallel to the mid-center plane BC, shown in FIG. 15A about the rotary shaft 52 passing through and perpendicular to the center axis C of the combination of the bulb and the lens.

Thus, it will readily be seen that the headlamp module 51 can undergo a bowing or bobbing motion about the rotary shaft 52.

The rotary shaft 52 shown in FIG. 14 has a driven gear 53 mounted thereon for rotation together therewith, which driven gear 53 is meshed with a drive gear 54 disposed in the vicinity thereof and drivingly coupled with a drive unit 57 such as, for example, an electric DC motor through a drive shaft 59.

The rotation of the drive unit 57, which is controlled by a control unit 60, is transmitted to the headlight casing 21 through the drive gear 54 and then through the driven gear 53 meshed therewith so that the headlight casing 21 can be tilted an angle ø about the rotary shaft 52 upwardly or downwardly to change upwardly or downwardly the region of illumination through the combination of the bulb and the lens within the headlight casing 21. Accordingly, the drive gear 54, the driven gear 53 and the headlight casing 21 altogether form a illuminating region changing mechanism 61, which in turn cooperates with the drive unit 57 to form a light-distribution adjusting mechanism 62.

Figure 16:
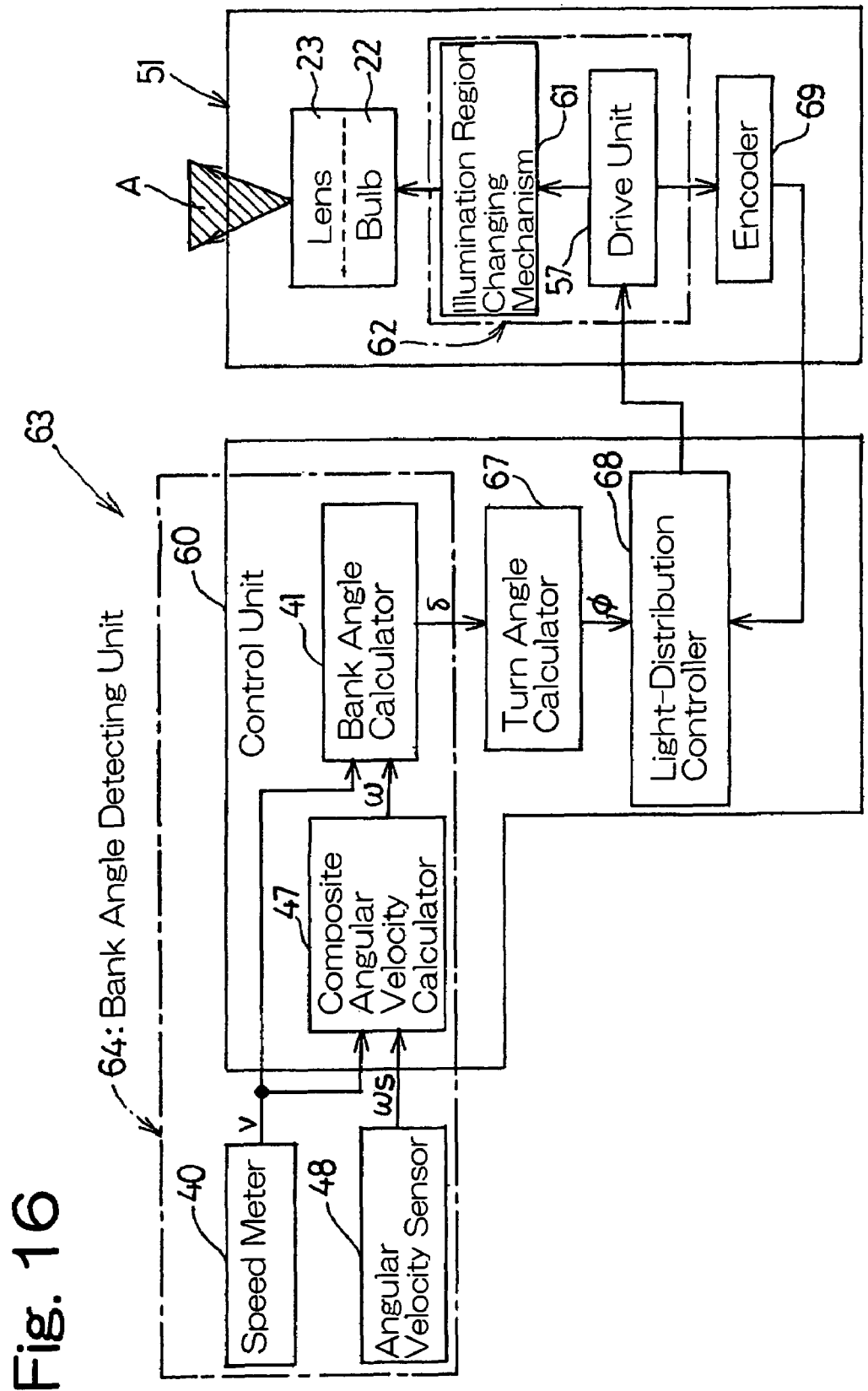
FIG. 16 is a block circuit diagram showing an electric circuitry of the headlight device according to the fourth embodiment of the present invention.

Referring to FIG. 16, showing a block diagram of a headlight device 63 according to the fourth embodiment, component parts similar to or corresponding to those shown in and described with reference to FIG. 3 are designated by like reference numerals employed in FIG. 3. A bank angle detecting unit 64 shown therein is of a design, in which the composite angular velocity calculator 47 may calculate the composite angular velocity ω on the basis of the traveling velocity v, measured by the speedometer 40, and the detected angular velocity ω measured by the uniaxial angular velocity sensor 48 of the type described in connection with the second embodiment, and the bank angle calculator 41 may calculate the motorcycle bank angle δ in reference to the composite angular velocity ω and the traveling velocity v. It is to be noted that in this embodiment, the motorcycle bank angle detected by a motorcycle bank angle detecting unit of any other construction can be equally employed.

The bank angle calculator 41 included in the bank angle detecting unit 64, a turn angle calculator 67, and the light-distribution controller 68 are built in the control unit 60 used to control the entire operation of the motorcycle 1. The turn angle calculator 67 referred to above is operable to the turn angle ø (See FIG. 14.) of the headlight casing 21 in the following manner. Specifically, assuming that the motorcycle bank angle calculated by the bank angle calculator 41 is expressed by δ, the height above the road surface, at which the headlamp module 51 is mounted, during the upright position of the motorcycle as shown in FIG. 15A is expressed by H, and the distance of spacing from the mid-center plane BC of the motorcycle to the headlamp module 51 is expressed by L, the height X of the headlamp module 51 above the road surface, which is reduced as a result of the motorcycle being banked at a bank angle δ, can be expressed by the following equation:

$$X = H \cdot \cos \delta \pm L \cdot \sin \delta \quad (12)$$

The height X of the headlamp module so calculated may take a negative (minus) value when the headlamp module 51 is banked in a direction away from the original position of the mid-center plane BC of the motorcycle and a positive (plus) value when the motorcycle is banked in a direction reverse to that direction. However, since the two headlamp modules 51 are generally juxtaposed side-by-side, spaced a small distance of spacing L, that is, a relatively small distance from each other, both of the heights X of the headlamp modules when the motorcycle tilts decrease to a values smaller than the height H, at which the headlamp module 51 is mounted and is assumed during the upright condition of the motorcycle, they can be calculated as negative values.

In the equation (12) above, the height H can be varied in correspondence with the bank angle δ. Considering that as shown in FIG. 5, not only the gravitational force mg, but also the centrifugal force f acts when the motorcycle banks, the total force acting on the motorcycle increases. The amount of increase thereof would be a multiplication of the gravitational force mg by 1/cos δ. As a result, since the suspension system compresses and the mounting height H correspondingly changes in a quantity corresponding to the amount of compression of the suspension, it is preferred for the mounting height H to be corrected in dependence on the bank angle δ. In view of this, with the characteristic of the suspension system taken into consideration, the relation between the mounting height H of the headlamp module 51 and the bank angle δ is beforehand determined by means of a calculation or an experiment and a table storing the data so determined is prepared. The turn angle calculator 67 reads from the table, the mounting height H of the headlamp module 51 corresponding to the motorcycle bank angle δ calculated by the bank angle calculator 41 and substitutes it into the following equation (12A) to thereby calculate the height X of the headlamp module 51 above the road surface, which is reduced in correspondence with the motorcycle bank angle δ:

$$X = H(\delta) \cdot \cos \delta \pm L \cdot \sin \delta \quad (12A)$$

Assuming that the distance of reach of the illumination effected by the headlamp module 51 while the motorcycle is traveling straight forward in the upright condition is expressed by D (See FIG. 17), the angle ø of upward turn of the headlight casing 21 required to maintain the distance of reach D of the illumination even when the motorcycle is tilted during the cornering can be expressed as follows:

$$ø = \tan^{-1}(H/D) - \tan^{-1}(X/D) \quad (13)$$

The equation (13) will be as follows when X is substituted into the equation (12) above:

$$ø = \tan^{-1}(H/D) - \tan^{-1}(H \cos \delta \pm L \sin \delta)/D \quad (14)$$

The turn angle calculator 67 shown in FIG. 16 is operable to calculate the upward or downward turn angle ø of the headlight casing 21 by inputting the mounting height H, which is stored in a memory (not shown), the distance of reach D of the illumination and the distance of spacing L, and the motorcycle bank angle δ calculated by the bank angle calculator 41 to the equation (14) above.

The light-distribution controller 68 referred to previously controls the rotation of the drive unit 57 on the basis of the turn angle ø calculated by the turn angle calculator 67, to thereby turn the headlight casing 21 upwards. When the amount of rotation of the headlight casing 21 detected by an encoder 69 attains a value equal to the magnitude of the turn angle ø, the light-distribution controller 68 responds thereto to halt the drive unit 57. Accordingly, when the motorcycle banks, the combination of the lens 23 and the bulb 22 that is fixedly accommodated within the headlight casing 21 is turned a turn angle ø corresponding to the motorcycle bank angle δ to illuminate upwardly and, therefore, the illumination from the headlamp module 51 can be maintained to reach a required distance of reach D at all times, resulting in change of the region of illumination enough to secure a field of view sufficient to encompass a faraway area of the road surface forwardly of the motorcycle.

In describing the fourth embodiment of the present invention, the headlight casing 21 accommodating the combination of the lens 23 and the bulb fixedly therein has been described as turned upwards or downwards. However, the headlamp module may be so designed as to maintain the region of illumination horizontally by rotating the combination of the lens 23 and the bulb an angle, corresponding to the motorcycle bank angle δ, in a direction counter to the direction in which the motorcycle is banked, such as in any one of the first and second embodiments described hereinbefore, and the headlight casing 21 for the headlight module so designed may be turned upwards in dependence on the motorcycle bank angle δ.

As a modification of the fourth embodiment described above, the standard headlamp module of a fixed type, in which the light-distribution adjusting mechanism 62 (See FIG. 14.) is eliminated from the headlamp module 51 shown in FIG. 15A, is used as a principal headlamp unit 51A; left and right auxiliary headlamp units 81 shown by the double dotted line, are added to form the headlight device 11A, in which the auxiliary headlamp units 81 are so designed that the illumination can reach further away from the motorcycle than the illumination afforded by the principal headlamp unit 51A. When one of the left and right motorcycle bank angles, which has been detected, exceeds a predetermined value, both of the auxiliary headlamp units 81 are lit by the light-distribution controller, without the region of illumination from the principal headlamp unit 51a being changed, so that the region of illumination can be expanded further away in parallel relation with the mid-center plane BC of the motorcycle. In this way, the distance of reach of the illumination generally equal to that during the straight forward run of the motorcycle can be maintained during the cornering.

It is to be noted that even in the fourth embodiment shown in and described with reference to FIGS. 14 to 17, the headlamp module 51 can be so designed that the rotational angle ø of the drive unit 57 may be controlled in proportion to the square of the deviation value between the target rotational angle and the actual rotational angle as is the case with the third embodiment shown in and described with reference to FIG. 13. Also, a predetermined (constant or variable) drive halt time subsequent to the halt of the drive unit 57 may be employed in the fourth embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A headlight device for a motorcycle which comprises:
   a headlamp module for illuminating an area of a road surface forwardly of the motorcycle;
   a light-distribution adjusting mechanism for changing a region of illumination cast by the headlamp module;
   a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
   a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further away from and at least inwardly of a direction of turn of the motorcycle to be illuminated,
   wherein the bank angle detecting unit comprises a uniaxial angular velocity sensor, which has a sensor axis positioned on a plane generally intermediate of a width of the motorcycle and inclined relative to the vertical axis of the motorcycle and also to the longitudinal axis of the motorcycle.

2. The headlight device for the motorcycle as claimed in claim 1, wherein the sensor axis of the uniaxial angular velocity sensor is inclined at an angle exceeding 0°, but not greater than 45° relative to the vertical axis of the motorcycle.

3. The headlight device for the motorcycle as claimed in claim 1, wherein the bank angle detecting unit includes a composite angular velocity calculator for calculating a composite angular velocity by the following equation using a composite angular velocity ωs calculated by the uniaxial angular velocity sensor:

$$\omega = \omega s / \cos \theta_G$$

where $\theta_G$ is an angle of the inclination of the uniaxial angular velocity sensor.

4. A headlight device for a motorcycle which comprises:
   a headlamp module for illuminating an area of a road surface forwardly of the motorcycle;
   a light-distribution adjusting mechanism for changing a region of illumination cast by the headlamp module;
   a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
   a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further away from and at least inwardly of a direction of turn of the motorcycle to be illuminated, wherein the light-distribution controller performs a control to change the region of illumination, defined by the light-distribution adjusting mechanism, on a basis of a control value calculated by multiplying the detected bank angle by a multiplication factor that varies depending on whether the motorcycle is banked leftwards or rightwards.

5. A headlight device for a motorcycle which comprises:
   a headlamp module for illuminating an area of a road surface forwardly of the motorcycle;
   a light-distribution adjusting mechanism for changing a region of illumination cast by the headlamp module;
   a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
   a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further away from and at least inwardly of a direction of turn of the motorcycle to be illuminated, wherein the light-distribution controller is operable to set a speed, at which the region of illumination is changed by the light-distribution adjusting mechanism, on a basis of a deviation value calculated by subtracting an actual amount of change from a target amount of change.

6. The headlight device for the motorcycle as claimed in claim 5, wherein the speed, at which the region of illumination is changed by the light-distribution adjusting mechanism, is set to a value calculated by multiplying a value, obtained by squaring the deviation value, by a multiplication factor.

7. A headlight device for a motorcycle which comprises:
a headlamp module for illuminating an area of a road surface forwardly of the motorcycle;
a light-distribution adjusting mechanism for changing a region of illumination cast by the headlamp module;
a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further away from and at least inwardly of a direction of turn of the motorcycle to be illuminated, wherein the light-distribution controller is operable to control the light-distribution adjusting mechanism in such a way that when change of the region of illumination is halted, a start is inhibited until a predetermined time passes subsequent to the halt of the change of the region of illumination.

8. A headlight device for a motorcycle, which comprises:
a headlamp module for illuminating an area of a road surface forwardly of the motorcycle;
a light-distribution adjusting mechanism for changing a region of illumination cast by the headlamp module;
a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
a light-distribution controller for controlling the light-distribution adjusting mechanism based on the motorcycle bank angle detected by the bank angle detecting unit, to shift or expand the region of illumination further away from the motorcycle in a direction parallel to a mid-center plane of the motorcycle, wherein the light-distribution adjusting mechanism is operable to turn upwards or downwards a headlight casing accommodating therein a light emitting element of the head light module.

9. The headlight device for the motorcycle as claimed in claim 8, wherein the light-distribution controller performs a control to change the region of illumination, defined by the light-distribution adjusting mechanism, on a basis of a control value calculated by multiplying the detected bank angle by a multiplication factor that varies depending on whether the motorcycle is banked leftwards or rightwards.

10. The headlight device for the motorcycle as claimed in claim 9, wherein the speed, at which the region of illumination is changed by the light-distribution adjusting mechanism, is set to a value calculated by multiplying a value, obtained by squaring the deviation value, by a multiplication factor.

11. The headlight device for the motorcycle as claimed in claim 8, wherein the light-distribution controller is operable to set a speed, at which the region of illumination is changed by the light-distribution adjusting mechanism, on a basis of a deviation value calculated by subtracting an actual amount of change from a target amount of change.

12. The headlight device for the motorcycle as claimed in claim 8, wherein the light-distribution controller is operable to control the light-distribution adjusting mechanism in such a way that when change of the region of illumination is halted, a start is inhibited until a predetermined time passes subsequent to the halt of the change of the region of illumination.

13. A headlight device for a motorcycle which comprises:
a headlamp module for illuminating an area of a road surface forwardly of the motorcycle;
a light-distribution adjusting mechanism for changing a region of illumination cast by the headlamp module;
a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
a light-distribution controller for controlling the light-distribution adjusting mechanism based on the motorcycle bank angle detected by the bank angle detecting unit, to change or expand the region of illumination, during a cornering of the motorcycle, to thereby enable an area of the road surface further away from and at least inwardly of a direction of turn of the motorcycle to be illuminated, wherein the bank angle detecting unit includes a composite angular velocity calculator for calculating a composite angular velocity by composing an angular velocity about the vertical axis of the motorcycle, and an angular velocity about the longitudinal axis of the motorcycle.

14. The headlight device for the motorcycle as claimed in claim 13, wherein the composite angular velocity calculator calculates the composite angular velocity $\omega$ by the following equation:

$$\omega = Ky \cdot \omega y + Kr \cdot \omega r$$

where $\omega y$ is the angular velocity about the vertical axis of the motorcycle, $\omega r$ is the angular velocity about the longitudinal axis of the motorcycle, Ky and Kr are respective correction coefficients that are variably set in dependence on the motorcycle traveling velocity.

15. The headlight device for the motorcycle as claimed in claim 14, wherein the function Kr is set to decrease with increase of the motorcycle traveling velocity.

16. The headlight device for the motorcycle as claimed in claim 14, wherein the bank angle detecting unit further includes a bank angle calculator for calculating a bank angle $\delta$ by the following equation using the composite angular velocity $\omega$ calculated by the composite angular velocity calculator:

$$\delta = \sin^{-1}(V \cdot \omega/g)$$

where g is the gravitational force and v is the traveling velocity measured by a speedometer.

17. A headlight device for a motorcycle, which comprises:
a headlamp module for illuminating an area of a road surface forwardly of the motorcycle;
a light-distribution adjusting mechanism for changing a region of illumination cast by the headlamp module;
a bank angle detecting unit for detecting a bank angle of the motorcycle in reference to an angular velocity about a vertical axis of the motorcycle, an angular velocity about a longitudinal axis of the motorcycle and a traveling velocity of the motorcycle; and
a light-distribution controller for controlling the light-distribution adjusting mechanism based on the motorcycle bank angle detected by the bank angle detecting unit, to shift or expand the region of illumination further away from the motorcycle in a direction parallel to a mid-center plane of the motorcycle, wherein the bank angle detecting unit includes a composite angular velocity calculator for calculating a composite angular velocity by composing an angular velocity about the vertical axis of the motorcycle, and an angular velocity about the longitudinal axis of the motorcycle.

18. The headlight device for the motorcycle as claimed in claim 17, wherein the composite angular velocity calculator calculates the composite angular velocity $\omega$ by the following equation:

$$\omega = Ky \cdot \omega y + Kr \cdot \omega r$$

where $\omega y$ is the angular velocity about the vertical axis of the motorcycle, $\omega r$ is the angular velocity about the longitudinal axis of the motorcycle, Ky and Kr are respective correction coefficients that are variably set in dependence on the motorcycle traveling velocity.

19. The headlight device for the motorcycle as claimed in claim 18, wherein the function Kr is set to decrease with increase of the motorcycle traveling velocity.

20. The headlight device for the motorcycle as claimed in claim 18, wherein the bank angle detecting unit further includes a bank angle calculator for calculating a bank angle $\delta$ by the following equation using the composite angular velocity $\omega$ calculated by the composite angular velocity calculator:

$$\delta = \sin_{-1}(v \cdot \omega/g)$$

where g is the gravitational force and v is the traveling velocity measured by a speedometer.

\* \* \* \* \*